May 15, 1923.
M. BERMAN
CLAMP
Filed Dec. 18, 1919.
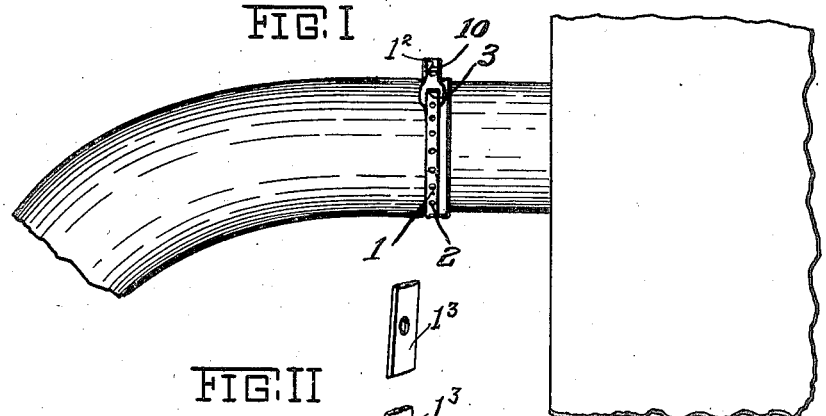
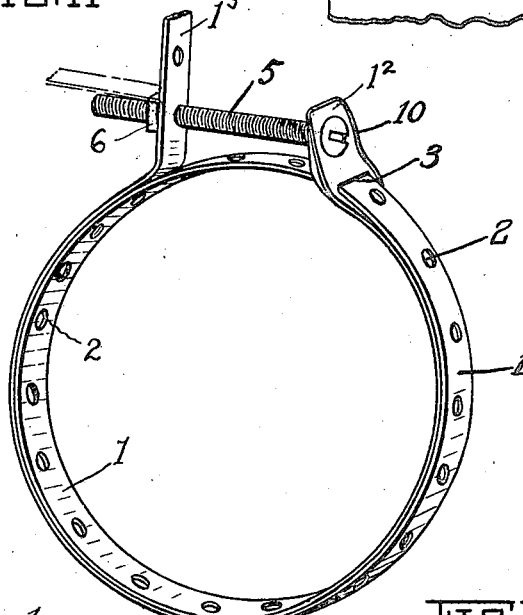
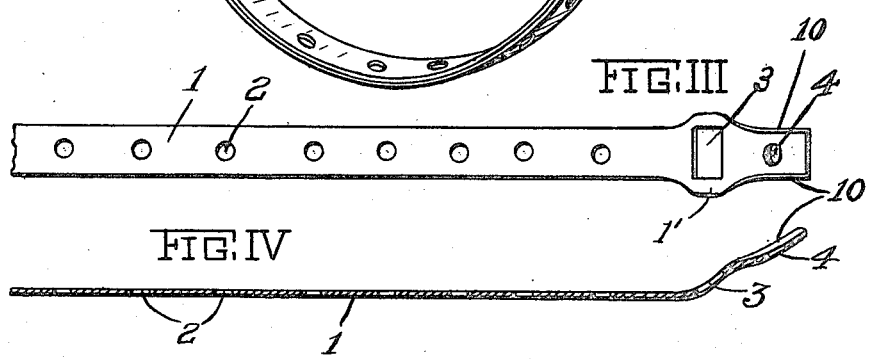
Inventor
Morris Berman
By ...
Attorney Patented May 15, 1923.

1,455,067

UNITED STATES PATENT OFFICE.

MORRIS BERMAN, OF MATTAPAN, MASSACHUSETTS.

CLAMP.

Application filed December 18, 1919. Serial No. 345,729.

*To all whom it may concern:*

Be it known that I, MORRIS BERMAN, a citizen of the United States, residing at Mattapan, county of Suffolk, Commonwealth of Massachusetts, have invented certain new and useful Improvements in Clamps, of which the following is a specification.

This invention relates to clamps and particularly to a clamping band for a hose connection or the like. In many places such as in radiator connections in automobiles it is extremely important to get a tight clamping of the rubber connections and to maintain same under all conditions over a considerable period of time. It is furthermore necessary from time to time to replace the hose and in making such replacement the original clamps are frequently destroyed or damaged at least to an extent which renders it inadvisable to use them again. As the diameter of these connections vary considerably in different makes of cars or different places, a situation frequently arises for which suitable clamp is not available for the job.

It is the object of my invention therefore to provide a clamp capable of a wide variation in clamping diameter and at the same time one simple, easily handled and readily applied.

As illustrative of my invention I have shown in the accompanying drawing a form of clamp which I have found well adapted to practical use and one well adapted to convenient and inexpensive manufacture. In the accompanying drawings I have illustrated such a clamp and in these drawings and throughout the specification like reference characters are employed to indicate corresponding parts, and in the drawings:

Fig. I is a view showing my clamp applied.

Fig. II is a general view of my clamp adjusted.

Fig. III is a fragmentary plan view of the clamp, and

Fig. IV an edge view of the same.

My clamp consists of a strip 1 of considerable length, i. e. of length substantially greater than twice the periphery of the maximum circumferential measure of the largest tubing connection to be used. This strip is perforated at regular intervals by bolt openings 2 conveniently spaced along its length beginning at a point distant from the slotted end 1' substantially equal to the circumferential measure of the minimum size of tubing to be used.

The enlarged head 1' is transversely slotted at 3 and the upturned arm beyond its enlargement is indicated at $1^2$ in a flange stiffened by slight lateral fins 10 turned back on the edges. The arm has a bolt opening 4.

When not in use my strips may be packed flat or rolled conveniently and carried in a tool box or car pocket. When in use the strip is passed around the end of the tubing at its point of connection and passed through the slot 3 and returned about the tubing in a second or superimposed layer, being drawn tight. The free end $1^3$ is then bent up as indicated in the drawings and a bolt 5 passed through the opening 4 and the opposite opening 2 of the strip, and the nut set up thereon to draw the band tight.

The end $1^3$ is preferably bent back over the nut 6 so as to hold it from turning.

The uses to which my invention may be put are obviously many and all such uses, variations and modifications are to be considered to be within my invention if within the limits of the appended claims.

What I therefore claim and desire to secure by Letters Patent is:

1. A tube clamp comprising a flexible strip having a series of spaced engageable fastener connections extending substantially from end to end thereof, and having an upwardly bent head provided with a slot adjacent the point of bend and through which the opposite end of the strip is adapted to be passed, whereby to provide a tube encircling band, said strip beyond said head extending as a superposed layer partially encircling said band, the free end of said strip adapted to be bent upwardly at selected points to position one of the fastener connections opposite said upwardly bent head, and a fastener carried by said head and engaging the opposing fastener connection of the strip.

2. A tube clamp comprising a flexible strip having a series of spaced fastener holes therein extending substantially from end to end thereof, and having an upwardly bent head provided with a transverse slot at the point of bend and through which the opposite end of the strip is adapted to be passed, whereby to provide a tube encircling band, said strip beyond said head extending as a superposed layer partially encircling said band, the free end of said strip adapted to be bent upwardly at selected points to position one of the fastener holes opposite said upwardly bent head, a fastener carried by said head and engaging the opposing fastener hole of the strip, and means for detachably locking said fastener to said strip comprising a locking element on said fastener adapted to be set against the free end of the strip, that portion of the strip beyond said locking element adapted to be bent over upon said locking element whereby to frictionally clamp said locking element against movement on said fastener.

In testimony whereof I affix my signature in presence of two witnesses.

MORRIS BERMAN.

Witnesses:
VICTORIA LOWDEN,
MARION F. WEISS.